May 8, 1956 B. C. BELLOWS, JR 2,745,011

VERY HIGH FREQUENCY GAS DISCHARGE NOISE SOURCE

Filed May 20, 1952

INVENTOR
B. C. BELLOWS JR.
BY N. A. Ewing
ATTORNEY

United States Patent Office 2,745,011
Patented May 8, 1956

2,745,011

VERY HIGH FREQUENCY GAS DISCHARGE NOISE SOURCE

Brian C. Bellows, Jr., Brookside, N. J., assignor to Bell Telephone Laboratories, Incorporated, New York, N. Y., a corporation of New York Application May 20, 1952, Serial No. 288,869

4 Claims. (Cl. 250—36)

This invention relates to transmission systems in the very high frequency range and more particularly to noise sources employing electric gas discharges of the positive column type for this higher intermediate frequency range.

In the microwave frequency range, in the vicinity of 4000 megacycles, it has previously been proposed to couple this type of noise source to transmission systems by wave guides. In this respect the applications of W. W. Mumford, Serial No. 98,553, filed June 11, 1949, and now Patent No. 2,706,782, granted April 19, 1955, and Serial No. 169,125, filed June 20, 1950, and now Patent No. 2,706,784, granted April 19, 1955, both of which are assigned to the assignee of this invention, are considered pertinent. At frequencies below 50 megacycles, the currently used temperature limited noise diode appears to be satisfactory. In the higher intermediate frequency range, however, noise diodes tend to become unstable, and wave guide coupling means for a gaseous electric discharge device tend to be too large and cumbersome.

It has also been proposed by M. E. Hines, in application Serial No. 288,836, filed on May 20, 1952 concurrently with this application, to employ a tuned circuit coupling means with the inductance element surrounding the gas discharge. This circuital arrangement was, however, rather narrow in frequency band width, with the 3 decibel down points covering a 10 megacycle band in the 50–100 megacycle region.

The object of this invention is, therefore, to produce a simple, stable broadband noise source for this higher intermediate frequency range.

In a noise generator in accordance with this invention, capacitive type elements near the positive column discharge device constitute the direct noise pick-up means. In the embodiments to be described in detail hereinafter, the capacitive elements are conducting foils encircling the discharge tube, and are well suited to form part of a doubly tuned broad band circuit coupling the noise source to the output circuit.

The nature of the present invention and various objects, features and advantages in addition to those noted above will appear more fully from the following description of the embodiment of the invention shown in the drawings, in which.

Figures 1, 2:
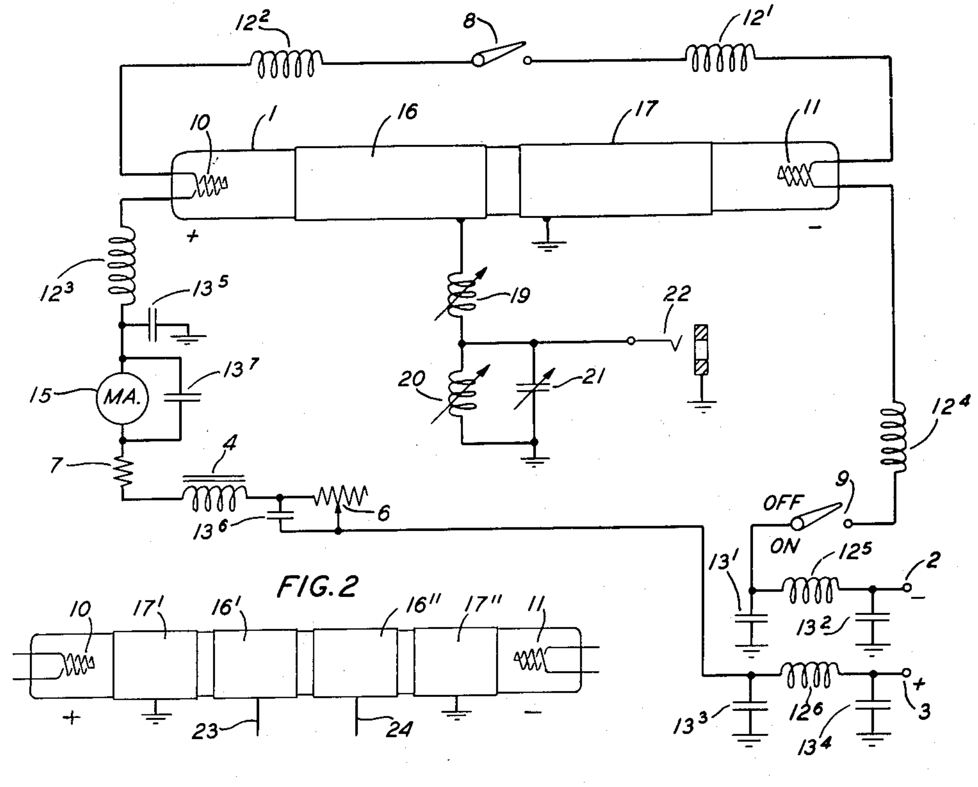
Fig. 1 shows a complete noise generation circuit in accordance with the invention.
Fig. 2 shows an alternative pick-up plate arrangement.

Before entering on a more detailed discussion of the drawings, a few general statements will be made concerning noise sources, and the nature of the gaseous discharge involved in noise generators made in accordance with the invention.

In accordance with the objects of the invention, it has been determined that the random motions of the electrons and ions in the positive column of a gas discharge will be picked up as random fluctuation currents by condenser plates adjacent this positive column. While it might have been anticipated that the net mass random motion of the ions in the positive column might cancel out and thus that no energy would be picked up, substantial transfer of energy to the pick-up plates is, nevertheless, observed for the high frequency noise generated in the discharge.

Such random fluctuation currents can be used to excite the input of a radio receiver or other sensitive amplifier and the signal so generated and amplified is termed "noise" by radio engineers. The discharge tube and its immediately associated circuits are termed "noise generators." As is well known in the art, such noise generators are particularly useful in testing the ultimate sensitivity of amplifiers for the detection of weak signals in the presence of noise generated by the amplifier itself.

Ordinarily, such noise generators are provided with an output connection consisting of a pair of terminals, a transmission line or a wave guide connection. The noise signal which appears at the terminals or line should desirably have the following characteristics:

(*a*) The frequency spectrum of the noise should be uniform over as wide a frequency band as possible. That is, that portion of the total noise power available within some artificially small band of frequencies should be independent of where that band is chosen within some very large band covered by the generator. For example, if a noise generator had a uniform spectrum from 50 megacycles per second to 100 megacycles per second, the noise power in the band 50 to 51 megacycles per second would be the same as that in the band 75 to 76 or 99 to 100 megacycles per second. The feature desired is that the region of uniformity covers a frequency band as broad as possible;

(*b*) The high frequency impedance as seen at the terminals should be substantially resistive in character and should be constant with frequency over as wide a frequency range as possible, corresponding to the frequency range of constant noise output.

(*c*) The noise power available from the generator should be sufficiently great that it will be readily detectable by a well designed amplifiers or radio receiver;

(*d*) The noise power output should be constant with time and be accurately known in terms of watts per cycle of bandwidth within its particular useful frequency band.

The particular noise generators disclosed herein are designed to fulfill the above-noted desiderata in so far as possible. In particular, the particular circuit employed is designed to fulfill (*a*) and (*b*) above, in giving a uniform frequency spectrum over a substantial frequency band. The use of the positive column gas discharge tube itself is useful in meeting the objectives of (*c*) and (*d*).

Proceeding to a consideration of the discharge, many of the characteristics and phenomena of electrical gas discharges have been known for some time, although it has not always been possible to give a complete explanation of the observable phenomena. It is known, for example, that when a tube containing a pair of plane parallel electrodes between which is contained a fixed quantity of gas at a low pressure, for example, a few millimeters of mercury, is connected by means of the electrodes to a source of potential, the gas in the tube will begin to glow, the color of the luminous region being a function of the gas or gases contained in the tube. If the gas in the tube is ionized by means of a suitably large potential applied, or by means of heat applied at the electrodes, the gas will break down and readily conduct current. This characteristic is known as a discharge, and is visually characterized by brightly lighted, but differently colored, luminous regions in the gas. These regions are known as follows:

Very close to the cathode there is a narrow dark region known as the "Aston dark space." Adjacent to this is a brightly colored region known as the "cathode glow." The "Crookes dark space" extends outward for some distance from the cathode glow. Adjacent to the Crookes dark space is a luminous region known as the "negative glow," which starts quite abruptly and gradually fades into the region known as the "Faraday dark space." The Faraday dark space merges into the luminous "positive column." This terminates in the "anode glow" which is separated from the anode by a narrow "anode dark space."

The largest portion of the glow is the positive column in which region there appears to be substantially an equal number of positive ions and electrons so that the net charge in this region is zero. For any particular gas at a given pressure, a certain minimum voltage is required to sustain gaseous discharge of this type having a positive column. In addition, the current must be regulated so as to be greater than the non-luminous, pre-breakdown range, and less than the high current arc discharge region. This is normally accomplished by the use of a ballast resistor in series with the current source.

For more detailed discussion of the various factors involved in these gas discharge phenomena, reference is made to chapter III, article 9 of Applied Electronics, by the E. E. Staff of M. I. T., the Technology Press, New York, John Wiley, 1943, and to chapter XI of Fundamental Processes in Electrical Discharges in Gases, by L. B. Loeb, New York, John Wiley, 1939.

It has also been found that the noise power is substantially independent of the current flowing through the discharge tube. As noted in the above-mentioned Patent No. 2,706,784 of W. W. Mumford, discharge tubes can now be made having substantially uniform noise power output at varying temperatures. In addition, preliminary investigation indicates that the noise frequency spectrum is substantially flat over a wide frequency band ranging from 50 to 10,000 megacycles.

The same is not necessarily true of energy radiated by the other regions of the discharge. In certain of these regions located on either side of the positive column, noise energy is variously affected by current, temperature, pressure of the gas and the impedance is adversely affected by the nearby presence of the electrodes. It would, therefore, appear that the level and quality of noise energy radiated by the positive column depends upon some invariant physical property of the atoms and ions within the positive column of the discharge. It is thus a purpose of the present invention to isolate and utilize microwave noise energy developed by such a positive column of a gas discharge.

Referring more particularly to Fig. 1 the discharge tube 1 is filled with a gaseous material of any of the types known to support an electrical gas discharge. This includes substantially all gases or combinations thereof, and suitable proportions required to sustain a positive column electric gas discharge therein are well known to all familiar with gas discharge devices. Among the several gases in common use in many commercial discharge devices are neon, helium, argon, sodium vapor and mercury vapor. This is, however, by no means an exclusive list. Thus, this discharge tube 1 may be of a standard commercial fluorescent lighting type. In particular, a General Electric type T–5, 6-watt daylight fluorescent lamp is satisfactory. The external circuit connected to the filamentary electrodes is quite conventional, being similar to the one commonly used in commercial fluorescent light circuits. It consists of a source of direct current potential 2, 3, connected in series with an iron core inductance 4, a variable resistance 6, a fixed resistance 7, switches 8 and 9, the positive electrode 10 and the negative electrode 11. In order to apply the direct current, switch 9 is closed. Starting switch 8 is then closed, completing the series circuit through filaments 10 and 11 and the voltage source 2, 3. After the filaments have become sufficiently hot to produce partial ionization of the surrounding gas, switch 8 is opened and the inductive kick due to the iron core inductance 4 causes the electric discharge to extend through the length of the envelope 1 from electrode 10 to electrode 11. Resistances 6 and 7 are provided to regulate and control the discharge current after the initiation of the discharge.

In addition to this basic lamp operating circuit, certain refinements are shown in Fig. 1. In particular, a large number of filtering inductances 12 and capacitors 13 were added to insure isolation of the circuit from undesired stray radiation. In the absence of other apparatus which would affect or be affected by the noise source at this frequency range, these elements could, of course, be dispensed with. Because of the dependence of the internal impedance of the noise source on the current drawn, the milliammeter 15 is placed in series with the discharge tube.

The direct means for coupling to the positive column are the capacitive foils 16 and 17 which individually encircle the discharge tube. A spacing of 7/16 inch between two foils 2⅞ inches long was found to be satisfactory. The foil 17, adjacent the less stable negative discharge region of the tube, is grounded. The circuit, including elements 19, 20 and 21, which connects the foil 16 with the output jack 22 is designed to give a moderately broad-band frequency response with a minimum number of circuital components, and will be discussed in more detail in connection with Figs. 2–5.

Figure 3:
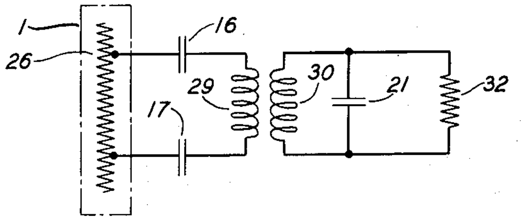
Fig. 3 represents the type of coupling circuit used.

If a balanced output is desired, as, for example, to the transformer primary 29 of Fig. 3, the coupling arrangement of Fig. 2 may be used. In this embodiment, the tube control circuits connected to the electrodes 10 and 11 are the same as in Fig. 1. Instead of only two capacitive elements, however, a balanced output is derived at the leads 23, 24 from the two center ungrounded metallic foils 16′ and 16″ while the outer foils 17′ and 17″ are grounded.

For maximum noise power output, it is desired that the discharge be properly coupled to the output circuit. In order to obtain efficient coupling it is necessary that the impedance of the noise generator as seen at its output terminals be the same as the characteristic impedance of the line to which it is connected. Furthermore, it is desirable that this impedance be purely resistive and that such resistance arise because of coupling of the gas discharge, rather than from other resistive circuit elements.

Fig. 3 indicates the type of coupling circuit used in the instant device. In this schematic drawing, 1 indicates the discharge tube, 26 indicates the positive column noise source, and 16, 17 are the metallic foils mounted on the discharge tube 1. The resistance 32 represents the desired 75-ohm surge or characteristic impedance of the standard coaxial line. The transformer 29, 30 serves to match the impedance of the gas discharge to this desired impedance. In addition, the primary and secondary of the transformer form separate tuned circuits with the condensers 16 and 17, and 21, both of which are resonant at the center frequency of the desired band which the noise source is designed to cover.

Figure 4:
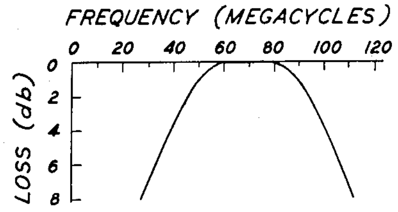
Fig. 4 is a plot of the loss against the frequency of the circuit of Fig. 3.

The curve of Fig. 4 is a generalized plot of loss versus frequency for the doubly tuned circuit of the type shown in Fig. 2. The characteristic shown in Fig. 4 has a center frequency of 70 megacycles, for which the specific component values for the circuits of Figs. 1 and 5 will be given.

Figure 5:
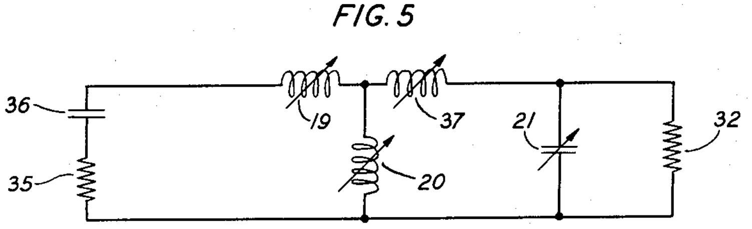
Fig. 5 is the equivalent circuit of that shown in Fig. 2.

The circuit of Fig. 5 is a well known equivalent to that of Fig. 3 and has very nearly the same output characteristics. In this circuit, the resistance 35 is equivalent to the gas discharge, the condenser 36 is equivalent to the coupling condensers 16, 17, the inductances 19, 20 and 37 are the equivalent of the transformer 29, 30 of Fig. 2. For a center frequency of approximately 70 megacycles, the positive column and the capacitive foils, shown in Fig. 5 as elements 35 and 36, have an apparent impedance of 46–*j*50 ohms, the inductance 19 is .13 μh., the inductance 20 is .23 μh., the inductance 37 turns out to be zero (and thus is not found in Fig. 1), and the capacitance 21 is 30 μμf.

From the foregoing detailed description of the circuital arrangement used in the present device it may readily be seen that the capacitive coupling means is particularly well adapted to be used in a simple broadband circuit. Note further the simplicity of the coupling circuit of Fig. 1 which, in addition to the two capacitive foils, includes only the two inductances 19 and 20 and the capacitor 21.

It is to be understood that the above-described specific embodiment, is merely an illustrative example of the type of structure and circuit which might be used for capacitive type coupling to a positive column discharge device. For example, the construction of other structural arrangements of capacitive pick-up elements and the layout of suitable equivalent circuits and the determination of the proper component values for the desired frequency range is considered within the scope of the invention.

What is claimed is:

1. In a noise source, an elongated gas tube, electrode means for establishing a steady positive column discharge extending without interruption for a predetermined distance along the length of said gas tube, two spaced capacitive pick-up elements located close to said positive column within said predetermined distance, a coupling circuit including lumped capacitive and inductive elements connected to said pick-up elements for coupling noise energy within a predetermined frequency band from said positive column to an output circuit, and means for isolating said positive column discharge from external circuits containing oscillations within said frequency band.

2. In a noise source, a gas tube, electrode means for establishing a steady positive column discharge extending without interruption for a predetermined distance within said gas tube, two spaced capacitive pick-up elements located close to said positive column, the space between said two pick-up elements being within said predetermined distance, a coupling circuit including lumped capacitive and inductive elements connected to said pick-up elements for coupling noise energy within a predetermined frequency band from said positive column to an output circuit, and means for isolating said positive column discharge from external circuits containing oscillations within said frequency band.

3. A noise source as defined in claim 2 wherein the capacitive pick-up element close to the negative electrode of said gas tube is grounded.

4. In a noise source, an elongated gas tube, electrode means for establishing a steady positive column discharge extending without interruption for a predetermined distance along the length of said gas tube, two spaced capacitive pick-up elements located close to said positive column, the gap between said two pick-up elements being within said predetermined distance, a coupling circuit for coupling noise energy within a predetermined frequency band between 50 and 150 megacycles from said positive column to an output circuit, and means for isolating said positive column discharge from external circuits containing oscillations within said frequency band.

References Cited in the file of this patent

UNITED STATES PATENTS

| | | |
|---|---|---|
| 1,263,204 | Butcher | Apr. 16, 1918 |
| 2,012,710 | Crosby | Aug. 27, 1935 |
| 2,051,601 | Hobart | Aug. 18, 1936 |
| 2,051,623 | Tonks | Aug. 18, 1936 |
| 2,119,333 | Kreienfeld | May 31, 1938 |
| 2,154,692 | Mountjoy | Apr. 18, 1939 |
| 2,264,718 | Rust | Dec. 2, 1941 |
| 2,312,211 | DeCola | Feb. 23, 1943 |
| 2,353,660 | Frech | July 18, 1944 |
| 2,643,297 | Goldstein et al. | June 23, 1953 |

OTHER REFERENCES

"Gaseous Discharge Super High Frequency Noise Sources," by Johnson and Deremer; Proc. I. R. E., vol. 39, issue 8, August 1951.

Article: Radio Frequency Conductivity of Gas Discharge Plasma in the Microwave Region, by Goldstein, Physical Review for January 1948.

"A Broad-Band Microwave Noise Source," by W. W. Mumford, Bell System Technical Journal, vol. 28, No. 4, October 1949, pp. 608–615.